(No Model.)
M. A. PIGOTT.
TIRE FOR WHEELS.
No. 289,358. Patented Nov. 27, 1883.
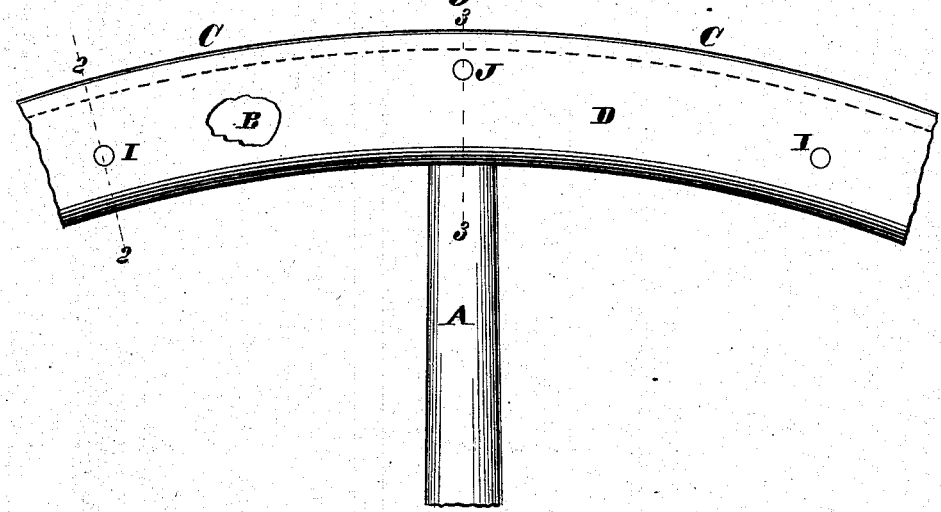
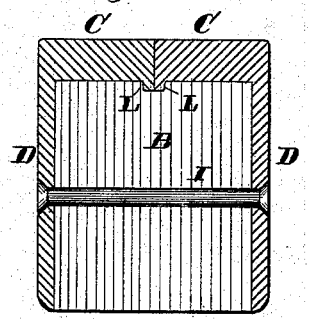
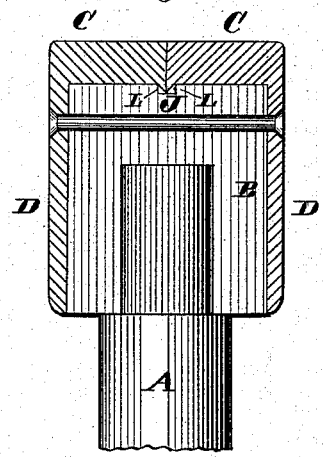
Attest:
Charles Pickles
Geo. L. Wheelock
Inventor:
Michael A. Pigott
By Knight Bros
Attys

UNITED STATES PATENT OFFICE.

MICHAEL A. PIGOTT, OF ST. LOUIS, MISSOURI.

TIRE FOR WHEELS.

SPECIFICATION forming part of Letters Patent No. 289,358, dated November 27, 1883.

Application filed September 26, 1883. (No model.)

*To all whom it may concern:*

Be it known that I, MICHAEL A. PIGOTT, of the city of St. Louis, in the State of Missouri, have invented a certain new and useful Improvement in Tires for Wheels, of which the following is a full, clear, and exact description, reference being had to the accompanying drawings, forming part of this specification, and in which—

Figure 1 is a side elevation; and Figs. 2 and 3 are transverse sections taken, respectively, on lines 2 2 and 3 3, Fig. 1.

My invention relates to tires for wheels of all kinds of vehicles; and my invention consists in features of novelty hereinafter fully described, and pointed out in the claims.

Referring to the drawings, A represents part of one of the spokes, and B part of the felly, of a vehicle-wheel.

C represents the tire, made in two parts, each part having a side flange, D, inclosing the sides of the felly, as shown in Figs. 2 and 3. The two parts meet at or about the center of the outer face of the felly, fully covering and protecting it from wear. The tire is secured to the felly by shrinking it thereon, and is preferably further secured by rivets I passing through the felly and the side flanges of the tire, between the spokes and rivets J over the spokes.

My improved tire fully protects the entire felly and strengthens it, and is not liable to get loose and come off.

I prefer to form small inwardly-projecting lips L on the adjacent edges of the two parts of the tire, which would be received by a circumferential groove in the center of the outer face of the felly, and which would further act to hold the tire in place.

I claim as my invention—

1. A tire made in two parts, with side flanges riveted to the felly, substantially as set forth.

2. A tire made in two parts, each part covering half of the outer face of the felly of the wheel, and having flanges that wholly inclose the sides of the felly, and which are secured thereto, substantially as set forth.

3. A two-part tire, each part wholly surrounding the wheel and covering half of the felly, substantially as set forth.

4. A two-part tire, provided with lips to enter the face of the felly, and side flanges to embrace the sides of the felly, as set forth.

MICHAEL A. PIGOTT.

In presence of—
SAML. KNIGHT,
GEO. H. KNIGHT.